(12) United States Patent
Milov

(10) Patent No.: US 7,805,008 B2
(45) Date of Patent: Sep. 28, 2010

(54) STRUCTURAL CONTENT FILTRATION OF HYPOTHESES IN A COGNITIVE CONTROL FRAMEWORK

(75) Inventor: Denis Sergeevich Milov, Kirishi (RU)

(73) Assignee: Intel Corporation, Santa Clara, CA (US)

( * ) Notice: Subject to any disclaimer, the term of this patent is extended or adjusted under 35 U.S.C. 154(b) by 1111 days.

(21) Appl. No.: 10/583,952

(22) PCT Filed: Nov. 14, 2005

(86) PCT No.: PCT/RU2005/000561
§ 371 (c)(1),
(2), (4) Date: Jun. 20, 2006

(87) PCT Pub. No.: WO2007/055614
PCT Pub. Date: May 18, 2007

(65) Prior Publication Data
US 2009/0161949 A1    Jun. 25, 2009

(51) Int. Cl.
*G06K 9/68* (2006.01)
(52) U.S. Cl. ............... 382/217; 358/462; 382/175; 382/176; 382/203; 386/124
(58) Field of Classification Search ........... 382/175, 382/176, 203, 217; 717/106, 110, 115, 124; 358/462; 386/124
See application file for complete search history.

(56) References Cited

U.S. PATENT DOCUMENTS

| | | | |
|---|---|---|---|
| 5,335,342 A | | 8/1994 | Pope et al. |
| 5,758,062 A * | | 5/1998 | McMahon et al. ........... 714/38 |
| 6,587,969 B1 * | | 7/2003 | Weinberg et al. ............ 714/46 |
| 6,961,447 B2 * | | 11/2005 | Onuma et al. .............. 382/103 |
| 7,110,025 B1 * | | 9/2006 | Loui et al. ................ 348/220.1 |
| 2002/0118293 A1 * | | 8/2002 | Hori et al. .................. 348/362 |
| 2003/0023952 A1 | | 1/2003 | Harmon, Jr. |
| 2003/0156827 A1 * | | 8/2003 | Janevski ....................... 386/96 |
| 2004/0194065 A1 | | 9/2004 | McGrath et al. |
| 2005/0134939 A1 * | | 6/2005 | Ikeda et al. ................. 358/471 |
| 2006/0156287 A1 * | | 7/2006 | Vikram ....................... 717/124 |
| 2007/0147801 A1 * | | 6/2007 | Yasuda et al. .............. 386/126 |

(Continued)

FOREIGN PATENT DOCUMENTS

WO    2007/055614 A1    5/2007

OTHER PUBLICATIONS

"Software Automation & Testing", Jun. 27, 2004 pp. 1-19, XP002383091 [retreived] May 26, 2006, <http://web.archive.org/web/20040627105104/http://www.redstonesoftware.com/EggplantOverview/Eggplant+Overview.pdf>.

(Continued)

*Primary Examiner*—Gregory M Desire
(74) *Attorney, Agent, or Firm*—Steven P. Skabrat

(57) ABSTRACT

Structural content filtration to reduce the number of hypotheses for the location of an active object in a recorded image generated by a graphical user interface (GUI) of an application program may be accomplished by transforming the recorded image and a corresponding playback image, determining a sub-image from the transformed recorded image which corresponds to an object to be searched for in the transformed playback image, determining a set of points on the transformed playback image which have appropriate values for matching the sub-image, and filtering hypotheses on the playback image which are more than a selected distance from any one of the subset of points.

21 Claims, 14 Drawing Sheets

U.S. PATENT DOCUMENTS

2009/0161949 A1* 6/2009 Milov .................... 382/162

OTHER PUBLICATIONS

"AcuTest", Jul. 11, 2004 XP002383092 [retrevied] May 29, 2006, <http://web.archive.org/web/20040711080728/http://www.tevron.com/acutest.asp>.

"Eggplant Tutorial, for Use with a MAC OS X System-Under-Test, Eggplant Version 3.1", Redstone Software, Inc. XP-002397141,(Jun. 3, 2005),1-18.

"Software Automation and Testing", Redstone Software, Inc. XP 002383091,(Jun. 27, 2004),1-19.

Herron, David , "Accessibility for Test Automation", David Herron's Blog, XP-002388052.,(Jul. 19, 2005),1-3.

International Preliminary Report on Patentability for Patent Application No. PCT/RU2005/000561, mailed May 22, 2008, 10 pages.

International Search Report/Written Opinion for Patent Application No. PCT/RU2005/000561, mailed Sep. 21, 2006, 15 pages.

* cited by examiner

Tuning Tuning Tuning Tuning Tuning

FIG. 8

STRUCTURAL CONTENT FILTRATION OF HYPOTHESES IN A COGNITIVE CONTROL FRAMEWORK

BACKGROUND

1. Field

The present invention relates generally to automatic control of software application programs and image analysis and, more specifically, to analyzing graphical user interface (GUI) images displayed by an application program for automatic control of subsequent execution of the application program.

2. Description

Typical application program analysis systems capture keyboard input data and mouse input data entered by a user. The captured input data may then be used to replay the application program. These systems rely on playback of the application program on the same computer system used to capture the input data, and thus are not portable.

Some existing application program analysis systems use image recognition techniques that are dependent on screen resolution and/or drawing schemes, or have strong dependencies to the underlying operating system (OS) being used. Such systems typically rely on dependencies such as Windows32 or X-Windows application programming interfaces (APIs). This limits their portability and usefulness.

Hence, better techniques for analyzing the GUIs of application programs are desired.

BRIEF DESCRIPTION OF THE DRAWINGS

The features and advantages of the present invention will become apparent from the following detailed description of the present invention in which:

FIG. 8 is an example image illustrating a hypothesis during the playback phase according to an embodiment of the present invention;

DETAILED DESCRIPTION

Embodiments of the present invention comprise a cognitive control framework (CCF) for automatic control of software application programs that have a graphical user interface (GUI). Examples of such applications programs may be executed on current operating systems such as Microsoft Windows® and Linux, for example, as well as other operating systems. An embodiment of the present invention creates a system simulating a human user interacting with the GUI of the application program and using the GUI for automatic control of the application program without relying on dependencies such as specific graphical libraries, windowing systems, or visual controls interfaces or implementations. The CCF comprises an easy-to-use cross-platform tool useful for GUI testing based on pattern recognition. By being independent of any OS-specific controls and graphical libraries, the CCF may be used for interaction with non-standard graphical interfaces as well as with well known ones. The system provides for recording any kind of keyboard and mouse actions the user performs while working with the GUI of the application program and then providing playback of the recorded scenario. In the present invention, image analysis of captured display data (such as screen shots, for example) is performed to identify actions of the application program corresponding to user input data. These actions and input data may be stored for use in future playback of the same user scenario for automatically interacting with the application program.

Embodiments of the present invention comprise operating on two phases: a recording phase and a playback phase. During the recording phase, the system is "learning" how to control the application program. The system registers and captures input actions supplied by the user (such as a mouse click or entering of text via a keyboard, for example) and display data (e.g. screen shots) of images displayed by the application program in response to those actions. The user actions, the time interval between actions, resulting display data of the GUI of the application program, and possibly other data and/or commands form an execution scenario. By following the execution scenario, during the playback phase the system provides the same but fully automatic execution of the application program (simulating the user control but without the real presence of the user). Automatic execution is made possible due to a plurality of image analysis and structural techniques applied correspondingly to images during the recording and playback phases.

Figure 1:
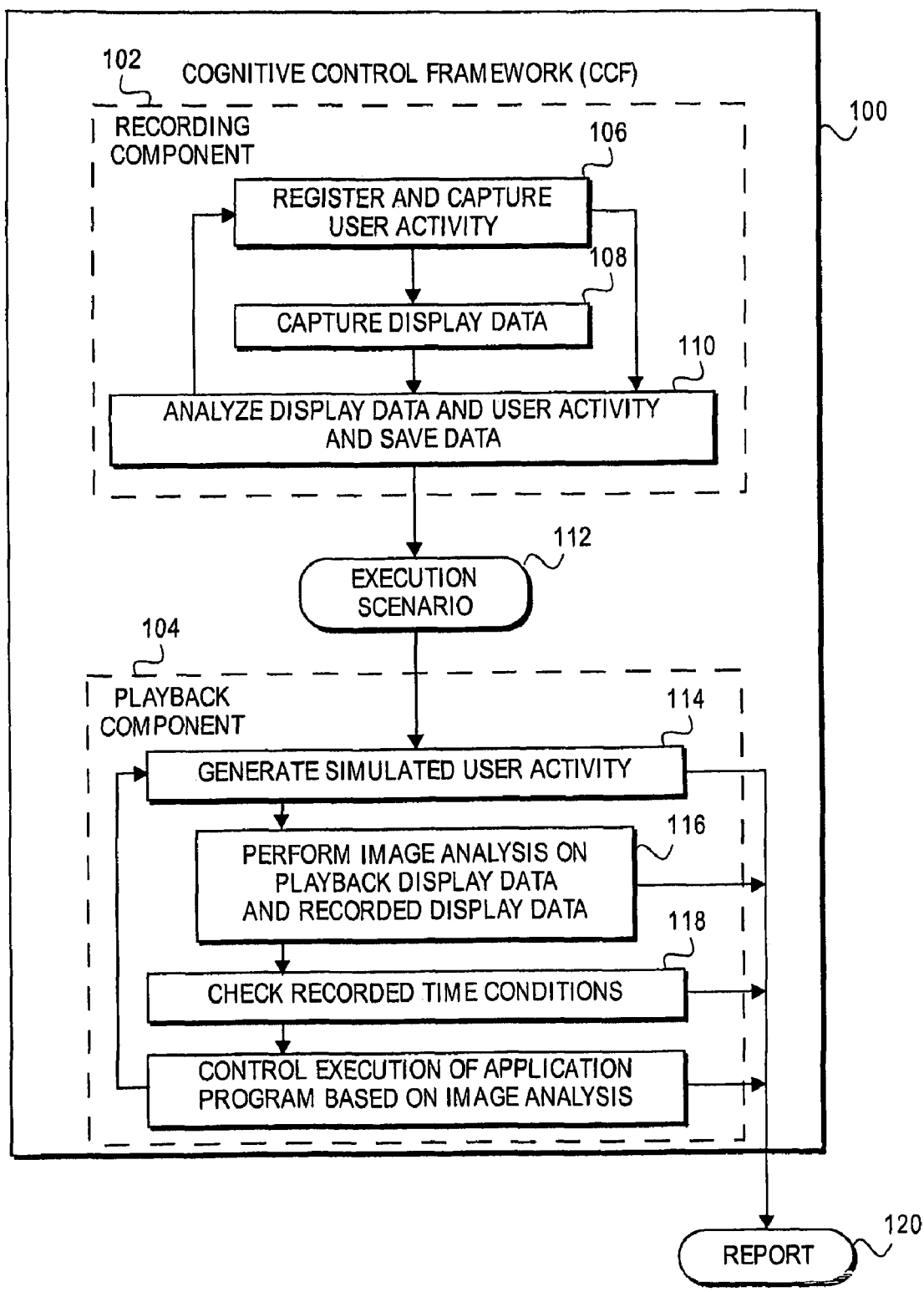
FIG. 1 is a diagram of a cognitive control framework system according to an embodiment of the present invention.

FIG. 1 is a diagram of a cognitive control framework (CCF) system 100 according to an embodiment of the present invention. FIG. 1 shows two components, recording component 102 and playback component 104. These components may be implemented in software, firmware, or hardware, or a combination of software, firmware and hardware. In the recording component, the CCF system registers and captures user input activity at block 106. For example, the user may make input choices over time to an application program being executed by a computer system using a mouse, keyboard, or other input device. This input data is captured and stored by the CCF system. Next, at block 108, the display data may be captured (e.g. screen shots are taken). In one embodiment, the display data may captured only when user input has been received by the application program. The display data is also saved. At block 110, the data captured during blocks 106 and 108 may be analyzed and saved. These processes may be repeated a plurality of times. The result of the processing of the recording component comprises an execution scenario 112 for the application program being processed by the system. In one embodiment, the execution scenario comprises a script containing Extended Markup Language (XML) tags. The execution scenario describes a sequence of user inputs to the application program, corresponding display images on a GUI of the application program, and commands directing the application program to perform some actions.

At a later point in time, during the playback phase the playback component 104 may be initiated. At block 114, simulated user activity may be generated based on the execution scenario. That is, saved inputs and commands from the execution scenario may be input to the application program for purposes of automatic control using the CCF system. While the application program processes this data, display data may be changed on the display as a result. At block 116, the CCF system performs image analysis on the playback display data currently being shown as a result of application program processing and the display data captured during the recording phase. At block 118, recorded time conditions may be checked to take into account possible variations in playback. For example, the time when an object appears may be within a time interval based on a recorded time. For example, in one embodiment a lower bound time (time to start the search) may be extracted from the saved data in the execution scenario and an upper bound time may be the lower bound time plus 10%, or some other appropriate value. Processing of blocks 114, 116, and 118 each result in data being stored in report 120. At block 119, the CCF system controls execution of the application program based on the results of the image analysis. Blocks 114, 116 and 118 may be repeated for each in a sequence of user input data items from the execution scenario.

The time interval between sequential actions is a part of the captured execution scenario. However, while following the execution scenario in the playback phase, one should not expect that the time interval between any two actions at playback will be equal to the time interval between the same two actions during the recording phase. There are a number of objective reasons why this interval could be different on playback than during recording. For example, the application program during recording and playback may be executed on different computer systems having different processor speeds, or an application program could require different times for the same actions during playback due to accesses of external data or resources. This indicates a requirement in the CCF system to handle flexible time conditions, e.g. handle some tolerance for the time interval between actions during the playback phase. During that time interval at playback, the system checks the recorded display data to the playback display data several times to determine if the playback display data is substantially similar to the recorded display data. A finding that the two are substantially similar indicates that a previous user action has completed and the system can progress to the next action in the execution scenario. This activity may be similar to the situation where the user is interacting with the application program and pauses periodically to view the display to determine if the expected visible changes to the display have been made by the application program based on previous actions. If so, then a new action may be performed. If at the end of a higher bound of the time interval the application program has not produced an image on the display that the CCF system expected according to the execution scenario, then the CCF system may interrupt the playback of the execution scenario and generate an error report describing how the execution scenario has not been followed. In one embodiment, the scenario may be corrected and the CCF system may be required to use other branches to continue.

The cognitive control framework (CCF) system of embodiments of the present invention performs image analysis and object detection processing on display data from the GUI of the application program. The CCF system includes comparing an image captured during a recording phase (called IR) to the corresponding image captured during the playback phase (called IP). One task of the system is to detect an object in the IR to which the user applied an action, find the corresponding object in the IP, and continue progress on the execution path of the execution scenario by applying the action to the detected object. These steps may be repeated for multiple objects within an image, and may be repeated across multiple pairs of IRs and IPs over time. An object that the user has applied an action to may be called an "object of action." Absence in the IP of the object of action corresponding to the one found at IR means that one should capture the IP again at a later time and try to find the object of action again. Finally, either an object of action may be found in the IP or execution of the scenario may be halted and a report generated describing how the wrong state was achieved and the scenario may not be continued. In embodiments of the present invention, this detection of objects of action may be done in real time during the playback phase, progressing from one action to another. Thus, the image analysis process employed must have good performance so as to introduce only a minimal disturbance to the time conditions at playback.

The CCF system of embodiments of the present invention comprises an image analysis and detecting process. Such a process has at least two requirements. First, the process should be able to overcome some variations in the captured images such as different color scheme, fonts, and the layout and state of the visual elements. In one embodiment, comparison constraints for checking these items (color scheme, fonts, etc.) may be set to specified parameters in accordance with specific needs. Overcoming these variations is desirable because recording and playback might be executed in different operating environments such as different screen resolutions, different visual schemes, different window layouts, and so on. Additionally, there could be insignificant differences in corresponding IR (usually captured after an action was applied to an object of interest) and IP pairs (captured after a previous action was completed). Second, the implementation of the image analysis and object detection process should be fast enough to introduce only minimal disturbances and delay of application execution during playback.

By processing captured images, the system builds descriptions of the images in terms of the objects presented on them.

Each display object may be represented by its contour and a plurality of properties. Table I enumerates some possible contour properties for use in the present invention. In other embodiments, other properties may also be used.

TABLE 1

Contour properties

| Property | Description |
| --- | --- |
| Location | Coordinates (on the image) of the contour center. |
| Image size | Characteristic contour size. In case of rectangular contours they are just vertical and horizontal sizes. For controls of more complicated shape, another format may be used. |
| Layout | Connection to other contours that lay in proximity to its boundaries/layout pattern of this contour. |
| Content Type | Indicates what is inside of the contour: text, image or a combination. |
| Content | If the content type is text, then a text string; if image (e.g. icon), then the image. |

Figure 2:
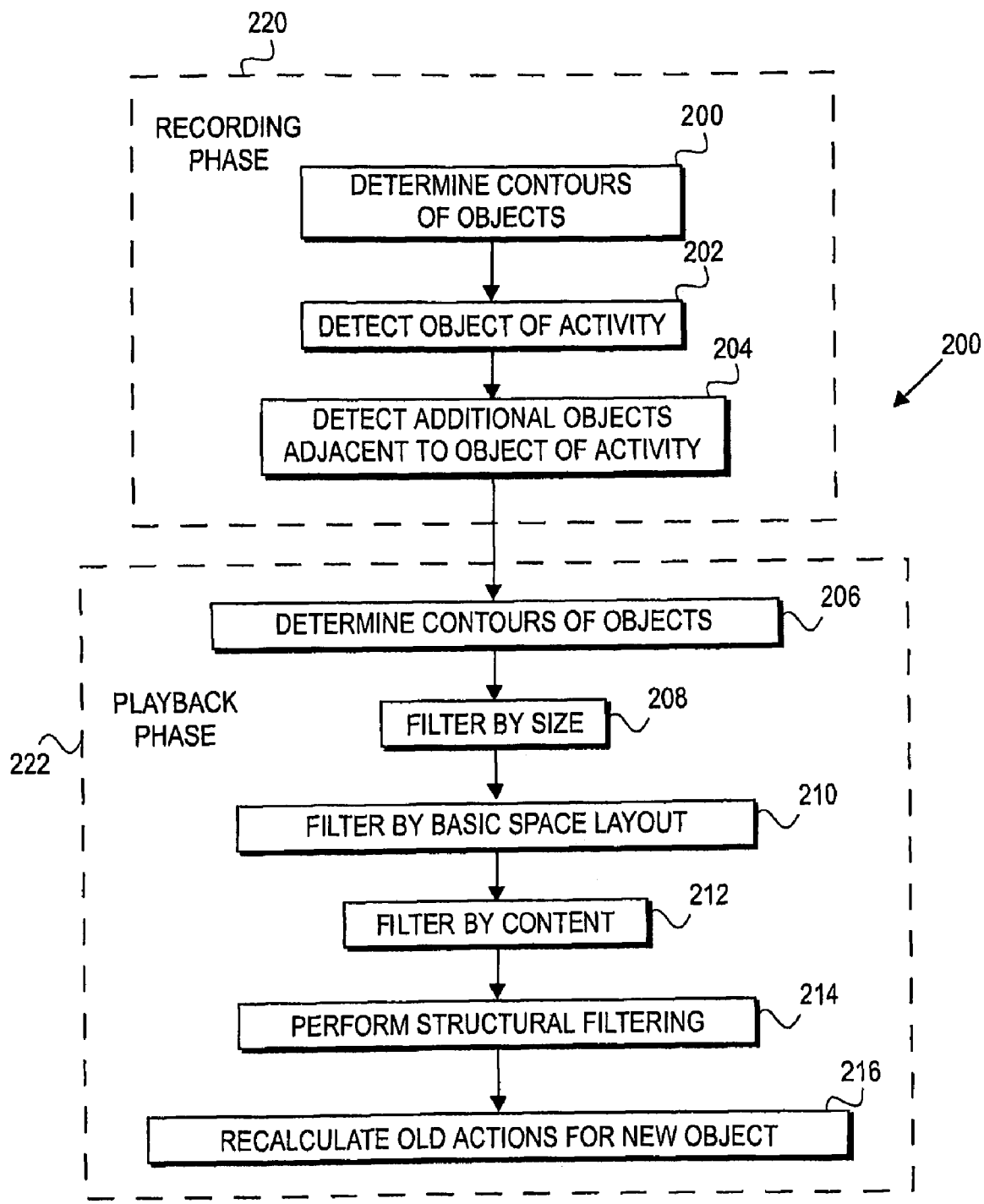
FIG. 2 is a flow diagram illustrating processing in a cognitive control framework according to an embodiment of the present invention.

FIG. 2 is a flow diagram illustrating processing of a CCF system according to an embodiment of the present invention. During the recording phase 220 handled by recording component 102, at block 200 the system determines contours of objects in the IR. At block 202, the system detects a current object of activity. At block 204, the system detects additional objects adjacent to the current object of activity in the IR. These steps (200, 202, and 204) may be repeated over time for all objects of activity during execution of the application program in the recording phase.

Next, during the playback phase 222 handled by playback component 104, at block 206 the CCF system determines the contours of objects in the IP. At block 208, the CCF system filters contours by size to determine contours that may become hypotheses for active objects and contours that connect them. At block 210, the CCF system filters the objects by basic space layout in the IP to determine subsets of hypotheses for active and additional objects. For example, filtering criteria for space layout may include tables, wizards, and menus. In one embodiment, the user (or CCF schema with a cascade search) could set both strict (e.g. "as is") and fuzzy (e.g. "object could be near each other") conditions. At block 212, the CCF system filters the objects by content to produce further subsets of hypotheses for active and additional objects. For example, the filtering criteria by content may include images and text. Moreover, in one embodiment, the user (or CCF schema with cascade search) could set both strict (e.g. "image should have difference in a few points and text should have minimal differences on a base of Levenstein distance") and fuzzy (e.g. "image could be stable to highlighting and have insignificant structural changes and text could have noticeable differences on a base of Levenstein distance without consideration of digits") conditions. At block 214, the CCF system performs structural filtering of the objects to produce a best hypothesis for active objects.

Finally, at block 216, the CCF system recalculates old actions for a new object by applying the action according to the execution scenario. For example, suppose the user selected (via the mouse) the screen location at (X=70, Y=200), and that a button is displayed at the rectangle denoted (X1=50, Y1=150, X2=100, Y2=100). In the IP, the button may be represented as a rectangle denoted (X1=250, Y1=300, X2=200, Y2=100). For a general view, coordinates of the top left corner and the size of the rectangle may be changed. The mouse click (user selection) may be recalculated based on the position of the button and the scaled size (for X and Y coordinates). The calculation gives the new mouse click coordinates (e.g., X=290, Y=350).

Table II shows the input data and output of the image analysis process for FIG. 2.

TABLE II

Image Analysis Processing

| Step | Input Data | Result | Input parameters and Description |
| --- | --- | --- | --- |
| 1. Contouring | Image from recoding (IR) | Contours | Thresholds, distances between objects (with some tolerance). Intel ® OpenCV library used in one embodiment. |
| 2. Detecting object of activity | Image IR and contours from previous step. | Contour representing object of activity | Typical object size (with tolerance) for object of action. Optical character recognition (OCR) and fuzzy text comparison, e.g. with Levenshtein distance. |
| 3. Detecting additional objects around object of activity | Image IR, contours and active objects. | Additional objects and their layout against object of action | Typical object size (with tolerance) for additional objects. Structural analysis, e.g. "criss-cross" rules. |
| 4. Contouring | Image from playback (IP) | Contours | Thresholds, distances between objects (with some tolerance). Intel ® OpenCV library used in one embodiment. |
| 5. Filtering by size | Contours from previous step | Contours that become hypotheses for active object and contours connected with them | Mean object size (with tolerance) based on active object characteristics evaluated at Step 2. Typical object size (with tolerance) for additional objects. Filtering out contours that don't fit into input size limits. |
| 6. Filtering by basic space layout | Subsets of hypotheses for active and additional objects | Decreased subsets of hypotheses for active and additional objects | Fuzzy distance filtration. Fuzzy filtration for directions. |
| 7. Filtering by content | Subsets of hypotheses for active and additional objects | Decreased subsets of hypotheses for active and additional objects | OCR and fuzzy text comparison, e.g. with Levenshtein distance. Fuzzy image comparison. Using "fuzzy content type" method for filtration. |
| 8. Structural filtering | Subsets of hypotheses for active and additional objects | The best hypotheses for active objects. | Method based on fuzzy triple links both between objects from IR and their hypotheses from IP. It's stable to additional objects which don't have strong structural links with active object. Moreover, one can use the result of this method to choose the best hypotheses for active objects. Some other methods, e.g. Hough transformation may also be used here. |
| 9. Recalculating old actions for new object | Object of action | Applied the action according to the execution scenario | Recalculating action coordinates in IP (playback image) coordinate system |

During filtering at each step there is an evaluation of specific contour properties (as required for a specific filter). This filtering pipeline is designed in such a way that the most time consuming evaluation steps are shifted to later in the processing pipeline when the number of contours (hypotheses) is smaller. By using this approach, the overall computational cost may be decreased, thereby helping to ensure good performance of the system.

It is useful to maintain a compromise in order to make sure that the system does not filter out some contours in the early steps that may be later determined to be either a hypothesis of an object of activity or objects connected with an object of activity. In this regard, predefined input parameters may be set to broad limits that requires spending a little more time on processing of additional contours (hypotheses), but ensure that the system has not dropped important contours.

Figure 3:
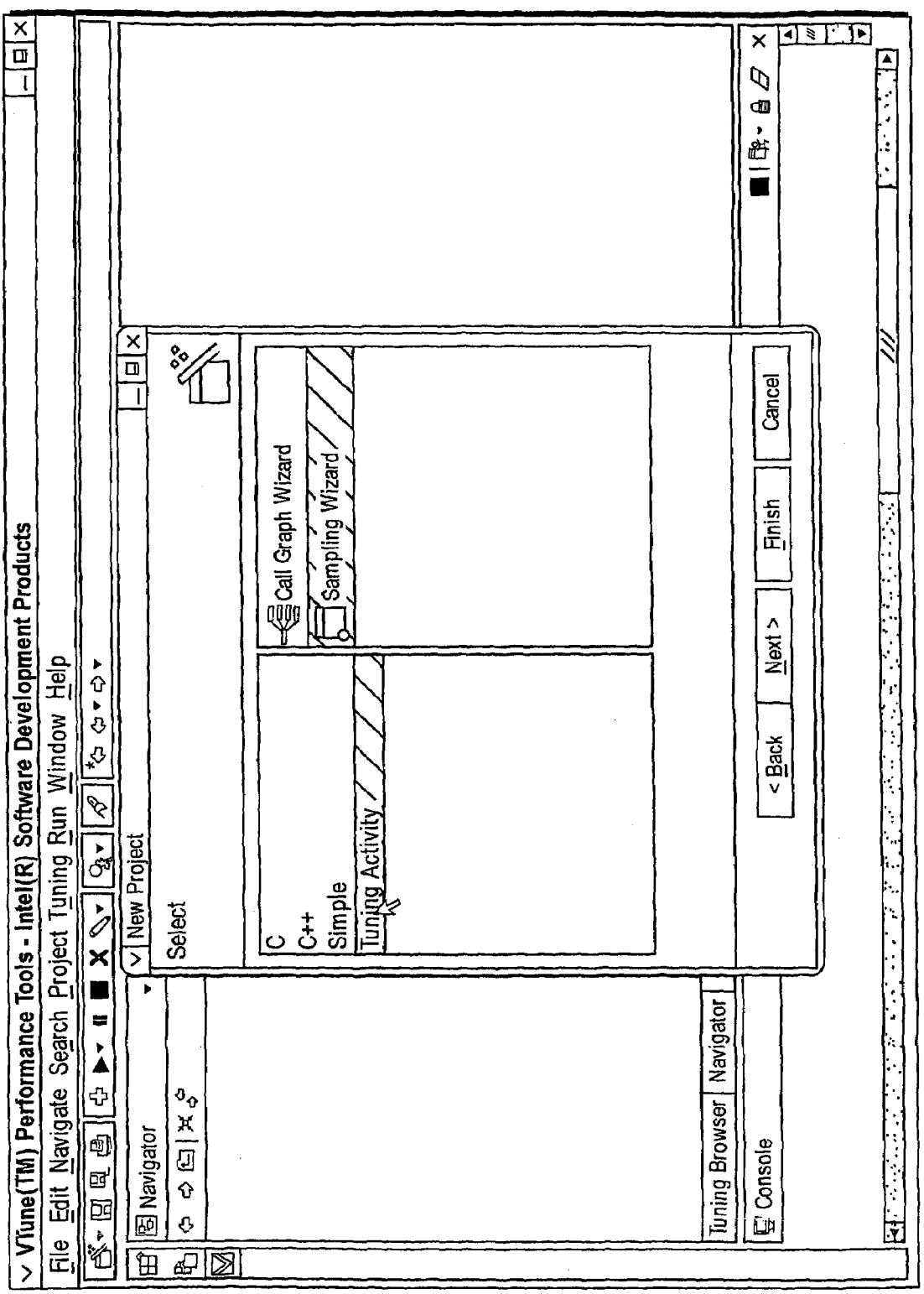
FIG. 3 is an example display of the GUI of an application program captured and saved during a recording phase.
Figure 4:
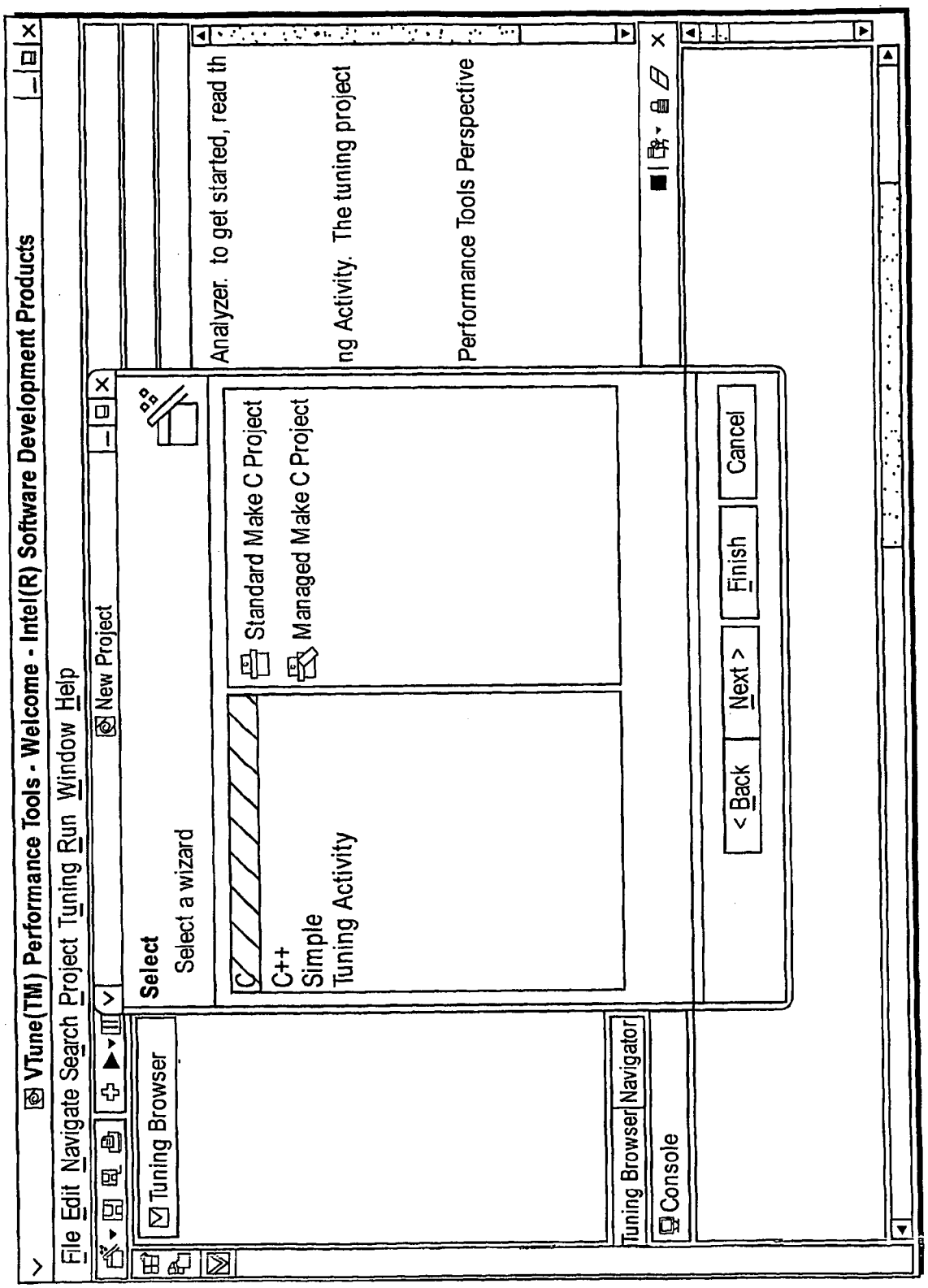
FIG. 4 is an example display of the GUI of an application program captured during a playback phase.
Figure 5:
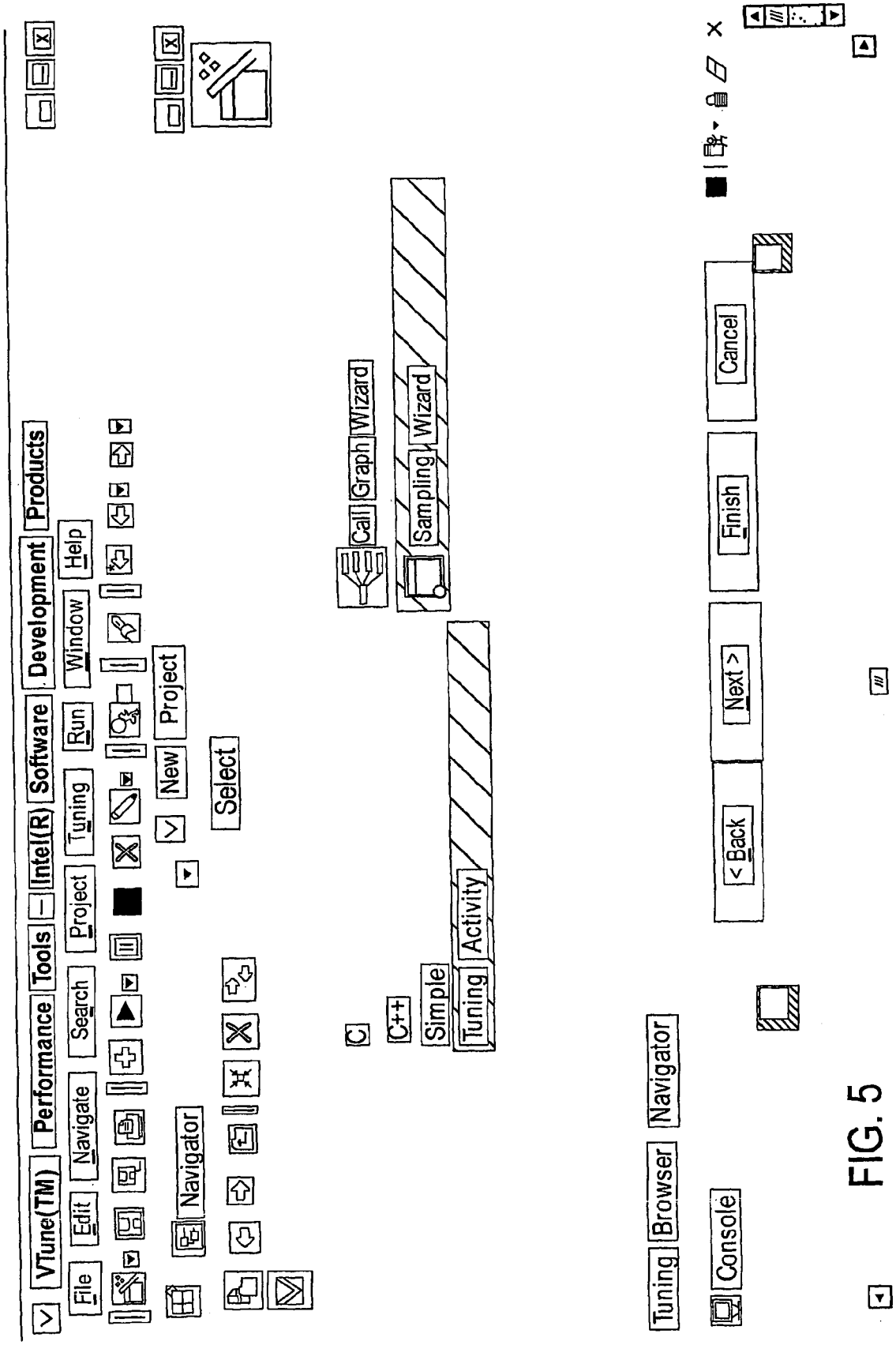
FIG. 5 is an example image illustrating objects identified during contouring operations of the recording phase according to an embodiment of the present invention.
Figure 6:
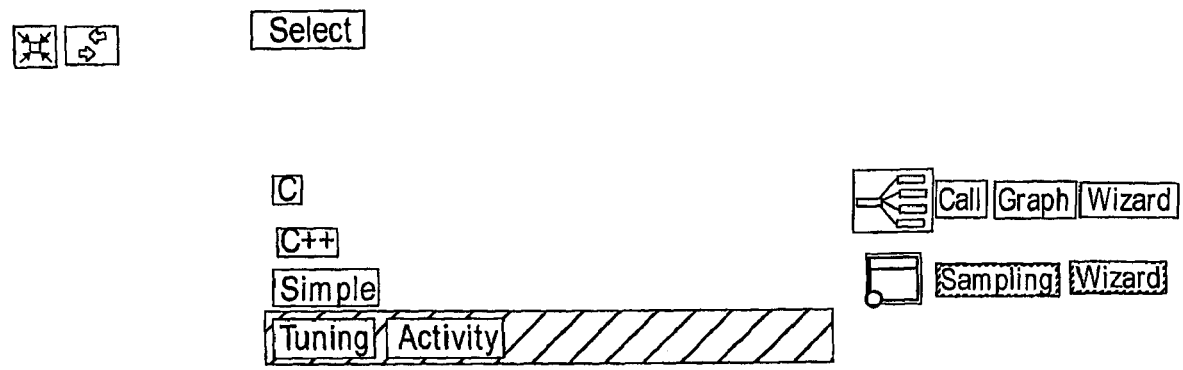
FIG. 6 is an example image illustrating objects of activity of the recording phase according to an embodiment of the present invention.
Figure 7:
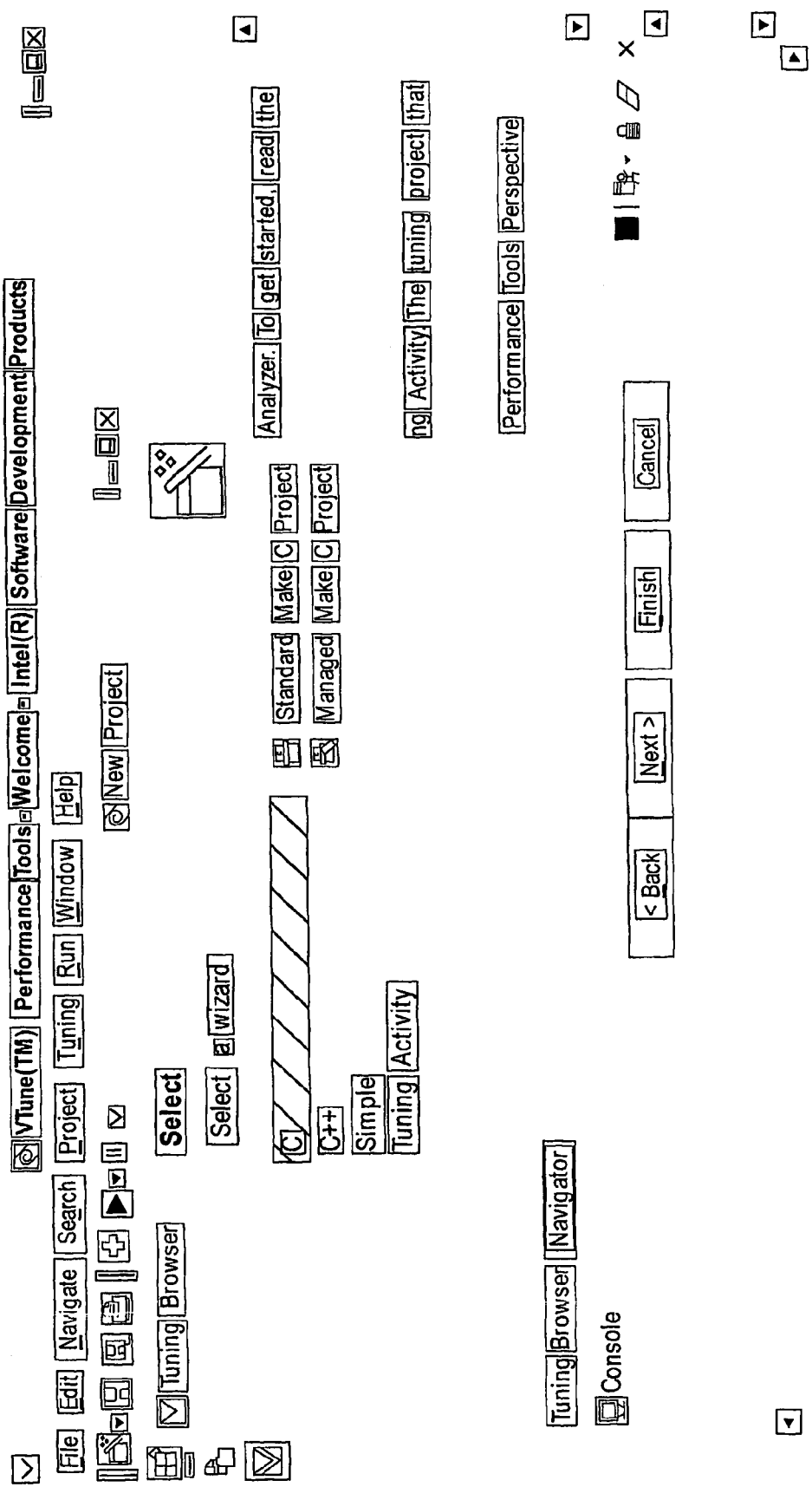
FIG. 7 is an example image illustrating objects identified during contouring operations of the playback phase according to an embodiment of the present invention.

Example pseudo-code for one embodiment of the present invention is shown in Table III.

ity" was selected by the user using a mouse. FIG. 4 is an example display of the GUI of an application program captured during a playback phase. Note there are some insignificant changes in the displayed windows in comparison to FIG. 3. FIG. 5 is an example image illustrating objects identified during contouring operations of the recording phase according to an embodiment of the present invention as performed on the image of FIG. 3. FIG. 5 shows the sample output from block 200 of FIG. 2. FIG. 6 is an example image illustrating objects of activity of the recording phase according to an embodiment of the present invention as performed on the image of FIG. 5. These contours were identified after performing blocks 202 and 204 of FIG. 2 on the image from FIG. 5. The contour with the text labeled "Tuning" has been determined in this example to be the current object of activity. FIG. 7 is an example image illustrating objects identified during contouring operations of the playback phase according to an embodiment of the present invention. This image is output

TABLE III

Pseudo Code Example

```
BEGIN CCF
<<<<<<< Recording >>>>>>>
LOOP /*recording, e.g. till a special key combination */
   Wait on user action /*mouse, keyboard, it's possible to set something else*/
   Hook and save screenshot /*e.g. <Screenshot fileName="1.png"/>*/
   Save time interval from the previous action /*e.g. <Sleep duration="2000"/>*/
   Save information about user action
      /*e.g. <Mouse action="RightClick" x="100" y="200"/>*/
END LOOP /*recording, e.g. till a special key combination*/
EXIT
<<<<<<< Post-processing >>>>>>>
Process saved data into a more compact form. It's possible for the user to change it for
his or her needs.
<<<<<<< Playback >>>>>>
LOOP /*till the end of saved data*/
   Load time interval and wait in accordance with it.
   IF [actions depend on coordinates on the screen] /*e.g. mouse click*/ THEN
      Load saved screenshot
      Detect object of action /*e.g. button*/, nearest structure-layout /*e.g. menu items
around button*/ and other useful info on saved screenshot
      TimeConditions_label: Hook the current screenshot
      Use image processing to find the corresponding object on the current screenshot
/*it's possible to require more information from saved screenshot during search*/
      IF [Object not found] THEN
         IF [Check time condition] /*e.g. it's possible to repeat search 3 times with 1000-
msec step, for example*/ THEN
            GOTO TimeConditions_label
         ELSE
            EXIT with error code /*moreover, it's possible to send corresponding report to
log-file*/
         END IF
      ELSE
         Recalculate actions on a base of new found objects /*e.g. recalculate new
coordinates for mouse click*/
      END IF
   END IF
   Produce actions /*it could be changed actions after image processing; moreover, it's
possible to finish execution in case of wrong situations during actions*/
END LOOP /*till the end of saved data*/
EXIT
END CCF
```

Figure 8:
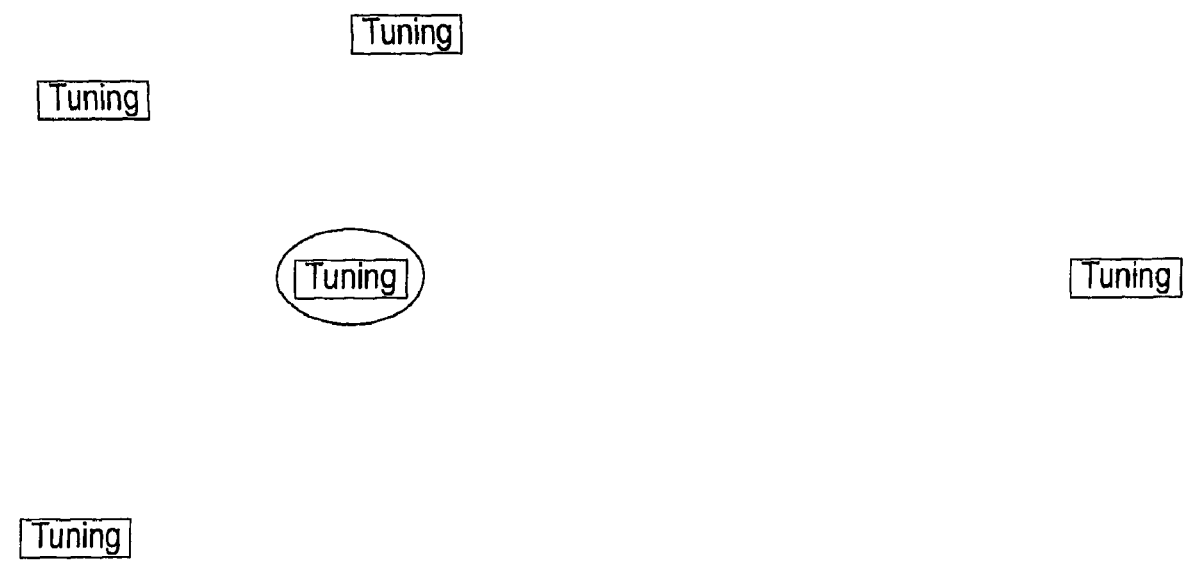

Embodiments of the present invention including image analysis and object of activity detection on two images may be illustrated by the following examples using a performance analyzer application program. These figures show applying the process blocks of FIG. 2 to a first image from the recording phase (IR) and a corresponding image from the playback phase (IP). FIG. 3 is an example display of the GUI of an application program captured and saved during a recording phase. This IR screen shot shows that the item "Tuning Activfrom performing block 206 of FIG. 2 on the sample image of FIG. 4. Finally, FIG. 8 is an example image illustrating a hypothesis during the playback phase according to an embodiment of the present invention. FIG. 8 shows hypotheses from FIG. 7 for the "Tuning Activity" object of activity from FIG. 6. Size, space, content, and structural filtration of blocks 206-214 has been performed. The ellipse represents the contour which was selected as the best hypothesis from performing block 216 of FIG. 2. A new point for the mouse click is recalculated relative to the given object (i.e., the "tuning" display object).

In some scenarios, filtration according to blocks 208 through 212 still result in many hypotheses to consider. When the number of hypotheses is large, more computational resources are needed. In one embodiment of the present invention, a structural content method for hypotheses filtration may be used to reduce the number of GUI hypotheses for objects in space (two dimensional (2D) for screen shots and multidimensional in the general case). This structural content method comprises a search scheme that is simple yet powerful to select the right hypotheses despite the presence of several GUI noise conditions. In embodiments of the present invention, the noise conditions may comprise changeable color schemes, highlighting of items, noise from video devices, anti-aliasing, and other effects.

After pre-filtration (according to size, text, etc. as in block 208 through 212 of FIG. 2), many hypotheses may remain for the objects of FIG. 4. The term hypothesis as used herein means a contour of an object on the playback image which corresponds to a contour of an object on the recorded image at this point in time. This means the previously applied filters didn't reject this correspondence. Application of the structural content method of hypotheses filtration of an embodiment of the present invention within block 116 of FIG. 1 and block 214 of FIG. 2 decreases the number of active hypotheses.

The structural content approach to hypotheses filtration may be understood with reference to an actual example (but a relatively simple example for purposes of explanation to avoid complex visual representations).

A general problem that embodiments of the present invention solves is how to reduce number of the GUI hypotheses in case of GUI noise conditions, including changeable color schemes, highlighting, video devices, anti-aliasing etc. The present approach is used inside the Cognitive Control Framework as an important part of the search filters to detect the right hypotheses. Embodiments of the present invention adapt to changes to an application program during product evolution.

Figure 9:
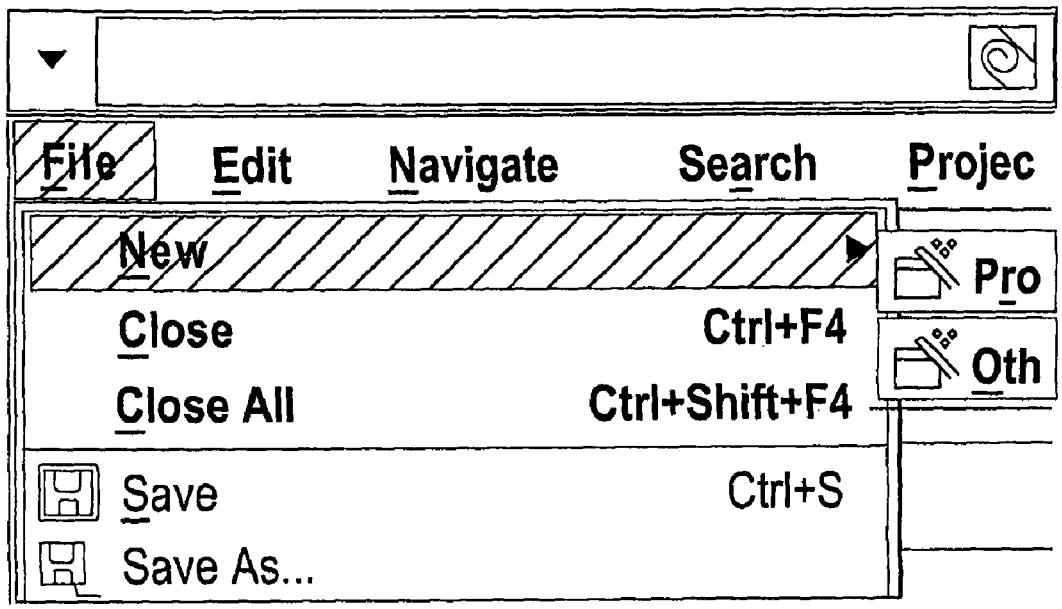
FIG. 9 is an example image illustrating a highlighted item in a GUI during the playback phase according to an embodiment of the present invention.
Figure 10:
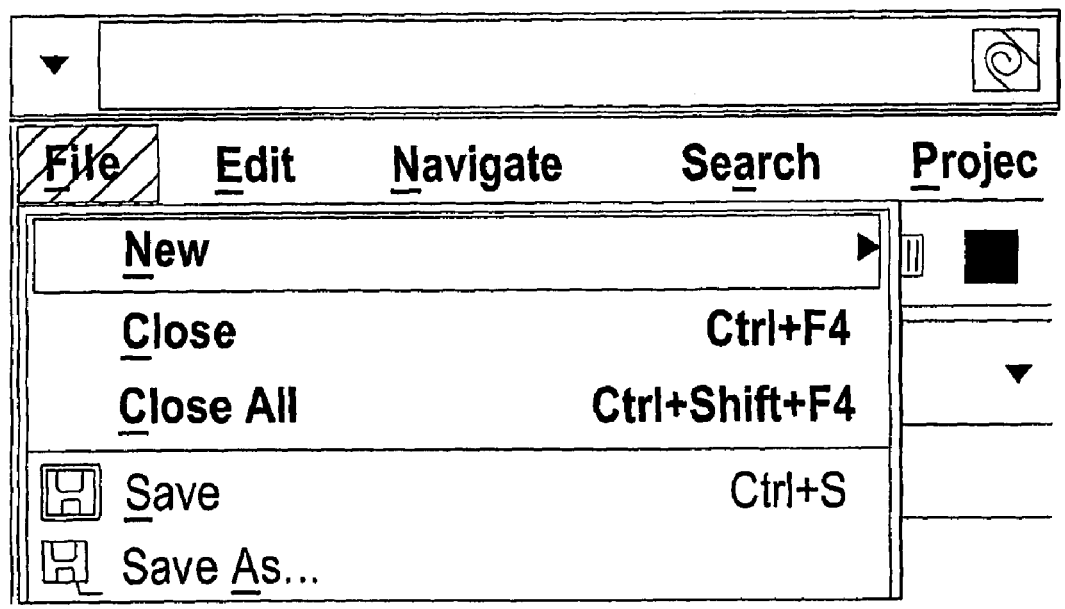
FIG. 10 is an example image illustrating no highlighting of an item in a GUI during the playback phase according to an embodiment of the present invention.

Initially, several GUI noise artifacts may be identified that should not be used to reject the correct hypothesis. For example, highlighted items may change colors (but not merely inverting black to white and vice versa) for part of an object's contour. FIGS. 9 and 10 represent this example. FIG. 9 is an example image illustrating a highlighted item in a GUI during the playback phase according to an embodiment of the present invention. FIG. 10 is an example image illustrating no highlighting of an item in a GUI during the playback phase according to an embodiment of the present invention. Note that a portion of a screenshot shown in FIG. 9 was captured during the recording phase. During operation of the application program using the GUI, a user selected the "New" item from the "File" menu. Detailed behavior for the given activity could be as follows (mouse activity is typically used, but usage of a "hot key" alternative is also possible). The user moved the mouse from the "File" menu header to the "New" item and selected this item. The highlighting for the selected item may be seen on the recorded image from the recording phase shown in FIG. 9. FIG. 10 shows a screenshot which may be captured during the playback phase. FIG. 10 will not include content for this highlighting because in this example the system was looking for the previous item and the user's mouse is situated at another location. In other words, during recording, a screenshot was captured when the mouse pointed on the "New" item and highlighting took place, but, during playback, the mouse clicked the "File" item on the previous step and then a screen shot was captured where the mouse pointed on this "File" item.

Figure 11:
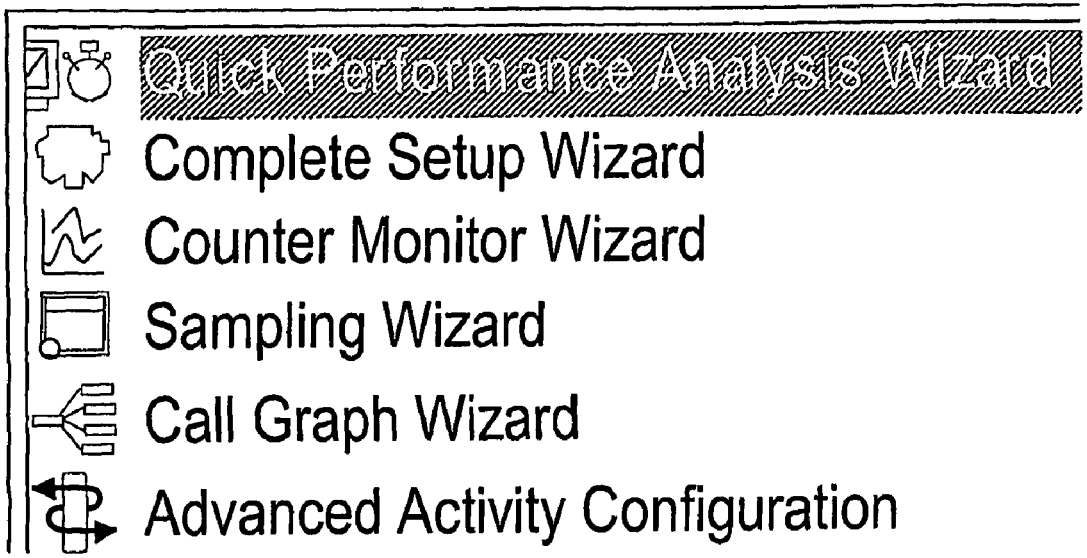
FIG. 11 is an example image illustrating complex highlighting for an item of a GUI during the playback phase according to an embodiment of the present invention.
Figure 12:
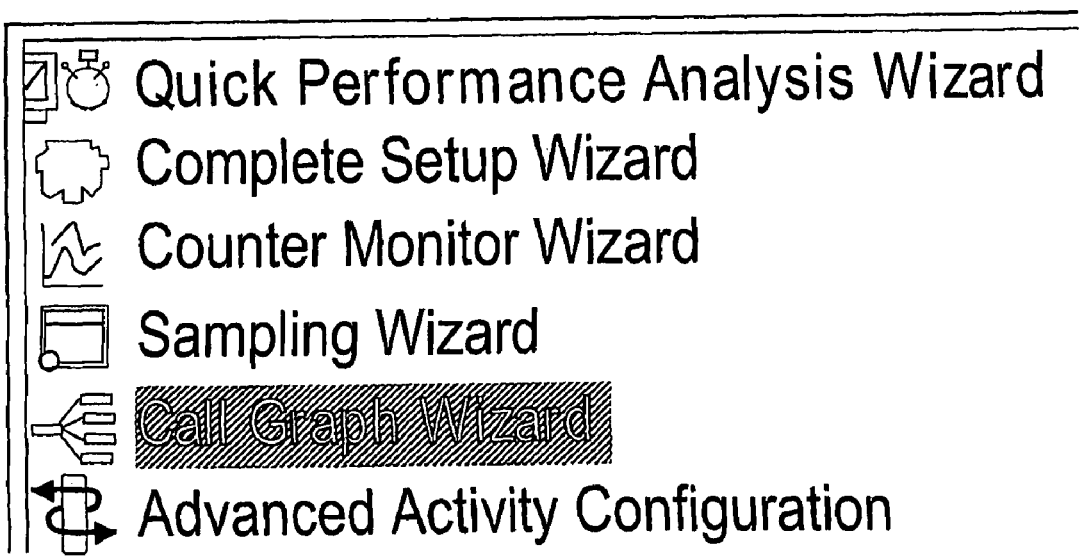
FIG. 12 is an image illustrating no highlighting for a searched item of a GUI during the playback phase according to an embodiment of the present invention.

It's possible to have more difficult conditions for highlighting, especially when contouring algorithms are unable to separate text from nearby icons. FIG. 11 is an example image illustrating complex highlighting for an item of a GUI during the playback phase according to an embodiment of the present invention. FIG. 12 is an image illustrating no highlighting for a searched item of a GUI during the playback phase according to an embodiment of the present invention. FIGS. 11 and 12 present highlighting with a strict bound between text and the icon (in this example, the highlighting has a dotted border). Moreover, some stochastic differences may exist because of anti-aliasing for text (note that Optical Character Recognition (OCR) is not a part of the present filter). Additionally, sometimes a highlighted object may be found based on an object without any highlighting (see the inverse problem for FIGS. 9 and 10). In other words, an inverse problem may be considered where an object on the recorded screen shot doesn't have highlighting but a corresponding object on the playback screen shot does. Some applications, especially Web-based applications, highlight objects of interest but switch highlighting off in case of clicking on these objects.

In reality, video driver software may also change some pixels in a screenshot. The changes may be insignificant, but still occur (e.g., RGB(254, 0, 0) is found instead of RGB(255, 0, 0)).

Figure 13:
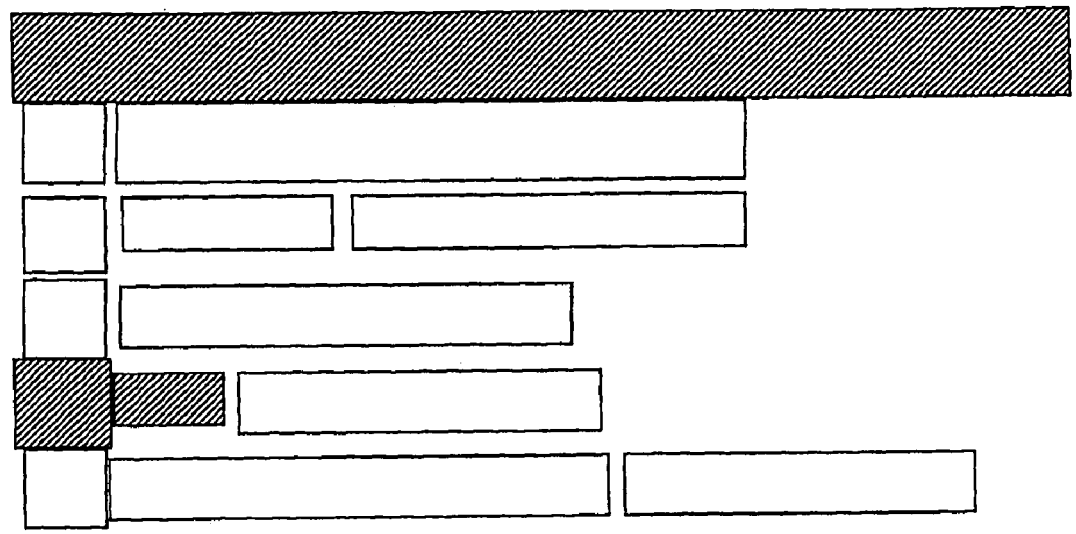
FIG. 13 is an example image illustrating contours of objects in a GUI during the playback phase according to an embodiment of the present invention.
Figure 14:
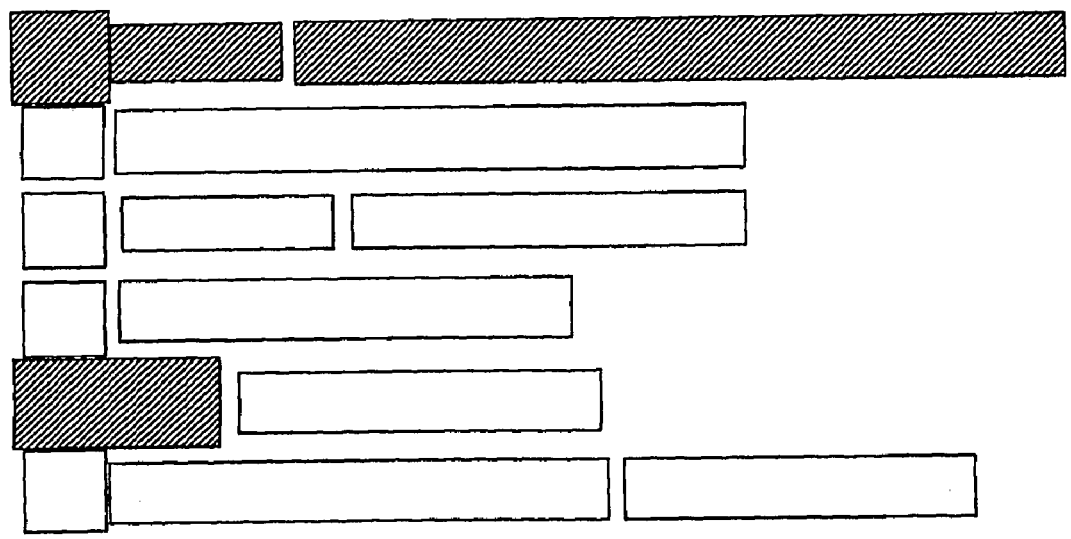
FIG. 14 is another example image illustrating contours of objects in a GUI during the playback phase according to an embodiment of the present invention.

GUI noise could affect the contouring procedure, especially noise concerning the width of contours. Active and additional objects could have different sizes in recorded and playback images. It's possible to have both merged and split contours there. FIG. 13 is an example image illustrating contours of objects in a GUI during the playback phase according to an embodiment of the present invention. FIG. 14 is another example image illustrating contours of objects in a GUI during the playback phase according to an embodiment of the present invention. FIGS. 13 and 14 present possible situations for FIGS. 9 and 10, respectively (in this example, changes are shaded in gray).

Such cases must not result in rejecting the correct hypothesis during application of the method of embodiments of the present invention. In one view, wide bounds should be set for sizes of objects in order to keep the correct hypothesis even after filtering by size of object. In another view, multiple incorrect hypotheses remain after filtration for sizes if the bounds are set too narrowly. Having many incorrect objects after this filtering step affects the effectiveness and performance of other, subsequent filters, especially the space structural filters.

The structural content filtration of embodiments of the present invention properly decreases the number of hypotheses. This method works well for filtration of additional objects, especially for non-textual objects. It is a useful component of the filters used for noise reduction in the Cognitive Control framework.

Usually, it's necessary to apply the present structural content filtering search scheme to several objects. The first transformation for recorded and playback images may be done once. Then, sub images may be obtained from the transformed recorded image and used for the search of the transformed playback image.

Let's consider a recorded image which has width W and height H. Color for every pixel of the image could be described by the value pair $C(i, j)$. A simple transformation may be applied for the color recorded image to transform it into a black and white (binary) image (e.g., where the color for every pixel is B(i, j)) as shown below.

$$B(0,j)=1, 0<=j<H \quad \text{(Equation 1)}$$

$$B(i,j)=C(i-1,j)\&C(i,j), 0\leq i \leq W, 0<=j<H \quad \text{(Equation 2)}$$

or, $$B(W-1,j)=1, 0<=j<H \quad \text{(Equation 3)}$$

$$B(i,j)=C(i,j)\&C(i+1,j), 0<=i<W-1, 0<=j<H \quad \text{(Equation 4)}$$

Figure 15:
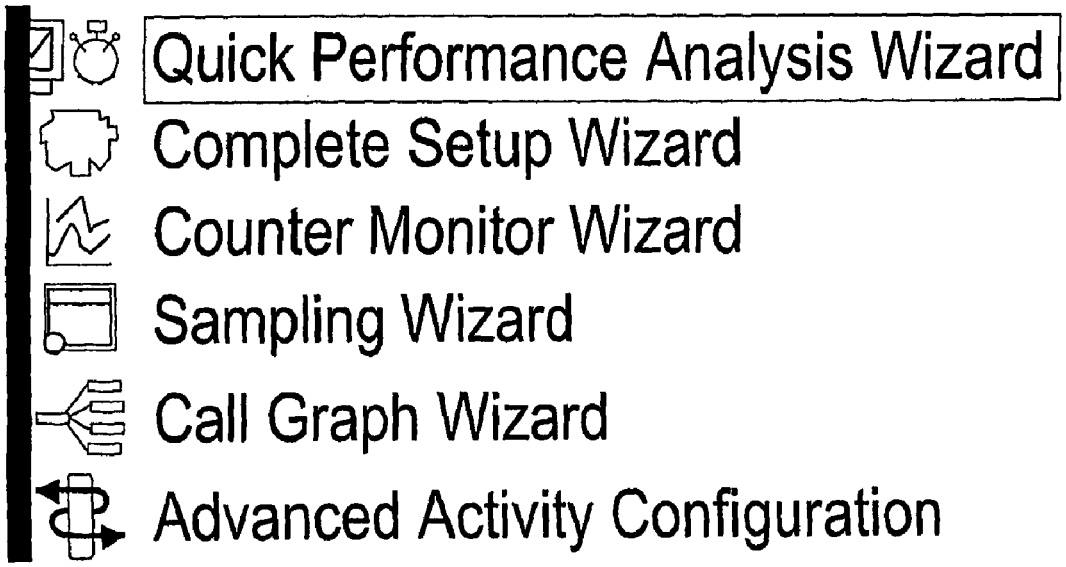
FIG. 15 is an example image illustrating a transformation of FIG. 11 according to an embodiment of the present invention.
Figure 16:
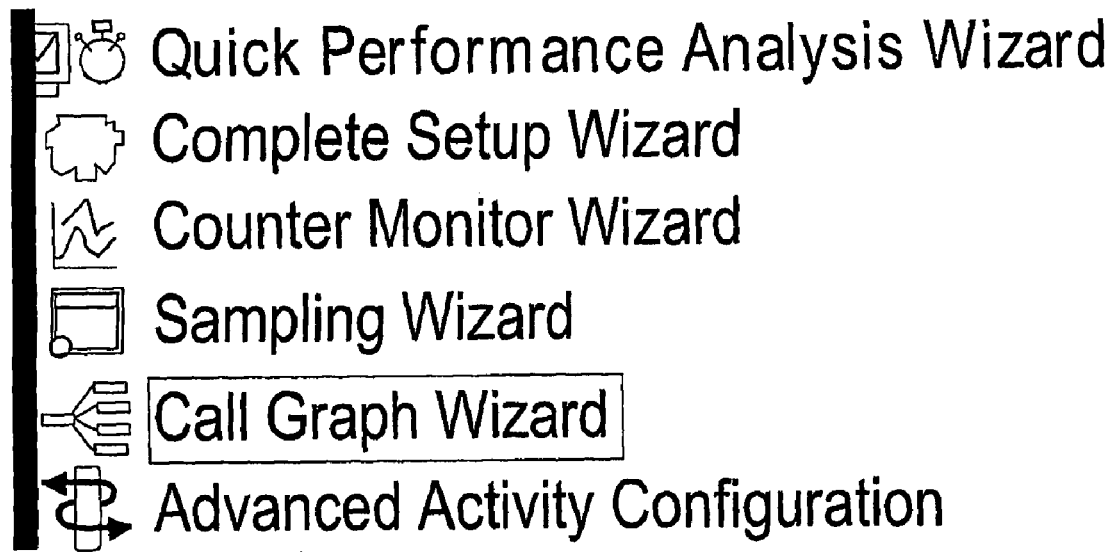
FIG. 16 is an example image illustrating a transformation of FIG. 12 according to an embodiment of the present invention.

FIG. 15 is an example image illustrating a transformation of FIG. 11 according to an embodiment of the present invention. FIG. 16 is an example image illustrating a transformation of FIG. 12 according to an embodiment of the present invention. FIGS. 15 and 16 present results for transformation of FIGS. 11 and 12 in accordance with equations (1) and (2); only this transformation is shown herein because the operation of equations (3) and (4) is similar. Note the color black may be used for B(0, j)=0 and the color white for B(0, j)=1 to avoid an undesirable black hardcopy view.

In one embodiment of the present invention, a MatchTemplate function with a CV_TM_SQDIFF key may be used. The CV_TM_SQDIFF key means that the function (MatchTemplate) uses the sum of squared differences to compare image regions with the template image (transformed one). The MatchTemplate function is provided in the OpenCV library publicly available from Intel Corporation. In other embodiments, other methods may also be used.

The MatchTemplate function "slides" (e.g. goes from the top left pixel to the bottom right pixel) a template (e.g. a transformed recording image) through an image (e.g., a transformed playback image), compares overlapped portions of the image of size w×h against the template (e.g., a sub-image from a transformed, saved image) using the specified (CV_TM_SQDIFF) method and stores the comparison results into a single-channel 32-bit floating-point result. If the size of the image is W×H and the size of the template is w×h, then the size of the result must be W−w+1×H−h+1. Equation 5 defines the formula used in the function, wherein I denotes image, T denotes template, and R denotes result. The summation is done over the template and/or the image portion: x'=0 . . . w−1, y'=0 . . . h−1:

$$R(x,y)=\text{sum}_{x',y'}[T(x',y')-I(x+x',y+y')]^2 \quad \text{(Equation 5)}$$

Note that it's possible to use a more simple transformation for the case than Equation (5):

$$R(x,y)=\text{sum}_{x',y'}|T(x',y')-I(x+x',y+y')| \quad \text{(Equation 6)}$$

Let's consider a sub-image from FIG. 15 which corresponds to a selected contour from FIGS. 11 and 13, such as the "Quick Performance Analysis Wizard" small icon on the left side of the image. Let's use a template to obtain a result image by application of the search (i.e., MatchTemplate function) on FIG. 16. Let our template have a size of w×h. The coefficient $Q_M$ may be set, which helps to detect a subset of points ($R_M$) from the result image (R):

$$R_M\{(x,y)|R(x,y)/(w*h)<Q_M\} \quad \text{(Equation 7)}$$

The filter is so effective that it's possible to use a very soft bound $Q_M$, e.g., 0.25 (that really means about 22-27% difference in structure). Regardless, in the present example there are three only close points: $R_M(3,3)\approx 0.107$, $R_M(2,3)\approx 0.225$, $R_M(3,3)\approx 0.226$. This is a concrete example with real coefficients which are very soft. The MatchTemplate function provides the result image which has real-value points. Only three points have appropriate values.

Finally, it's necessary to filter wrong hypotheses in the playback image of FIG. 12. Every point from the $R_M$ set presents a top left corner of a rectangle of size w×h. Hypotheses are rejected if the contour of a hypothesis does not have an intersection with any rectangle from $R_M$. It's also possible to use stronger procedures for filtration, e.g., a bound for the distance between the top left corner of a rectangle from $R_M$ and a contour of a hypothesis.

Figure 17:
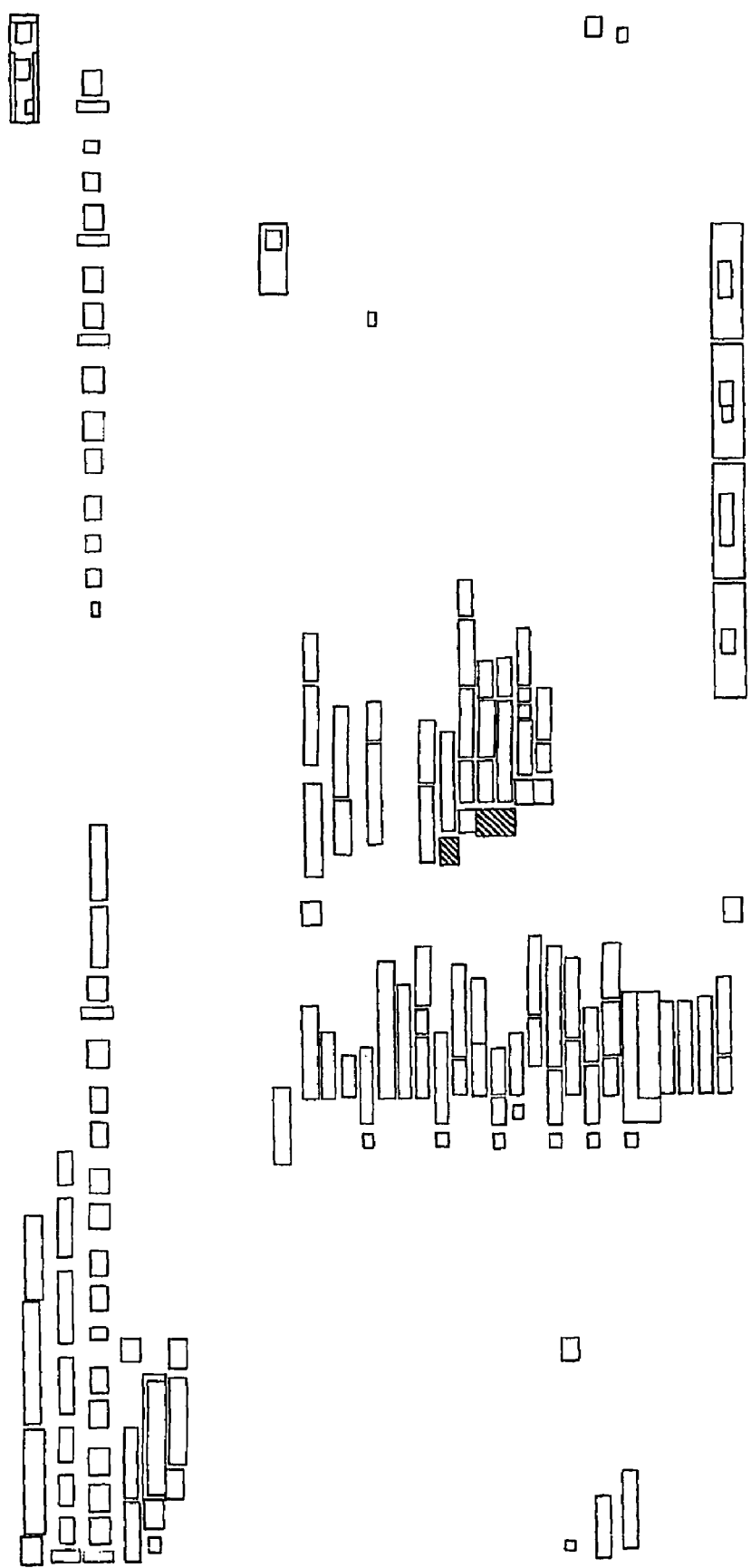
FIG. 17 is an example image illustrating a GUI for an application program after all contours of hypotheses for an additional non-text object are identified and before filtration results are presented according to an embodiment of the present invention.

Let's consider a more complex example which demonstrates the power of embodiments of the present invention as shown in FIG. 17. FIG. 17 is an example image illustrating a GUI for an application program after all contours of hypotheses for an additional non-text object are identified and before filtration results are presented according to an embodiment of the present invention. After applying the structural content filtration method of embodiments of the present invention, other procedures in the Cognitive Control Framework, especially fuzzy text and space structural filters, may be used to help complete the search for the right active object.

Figure 18:
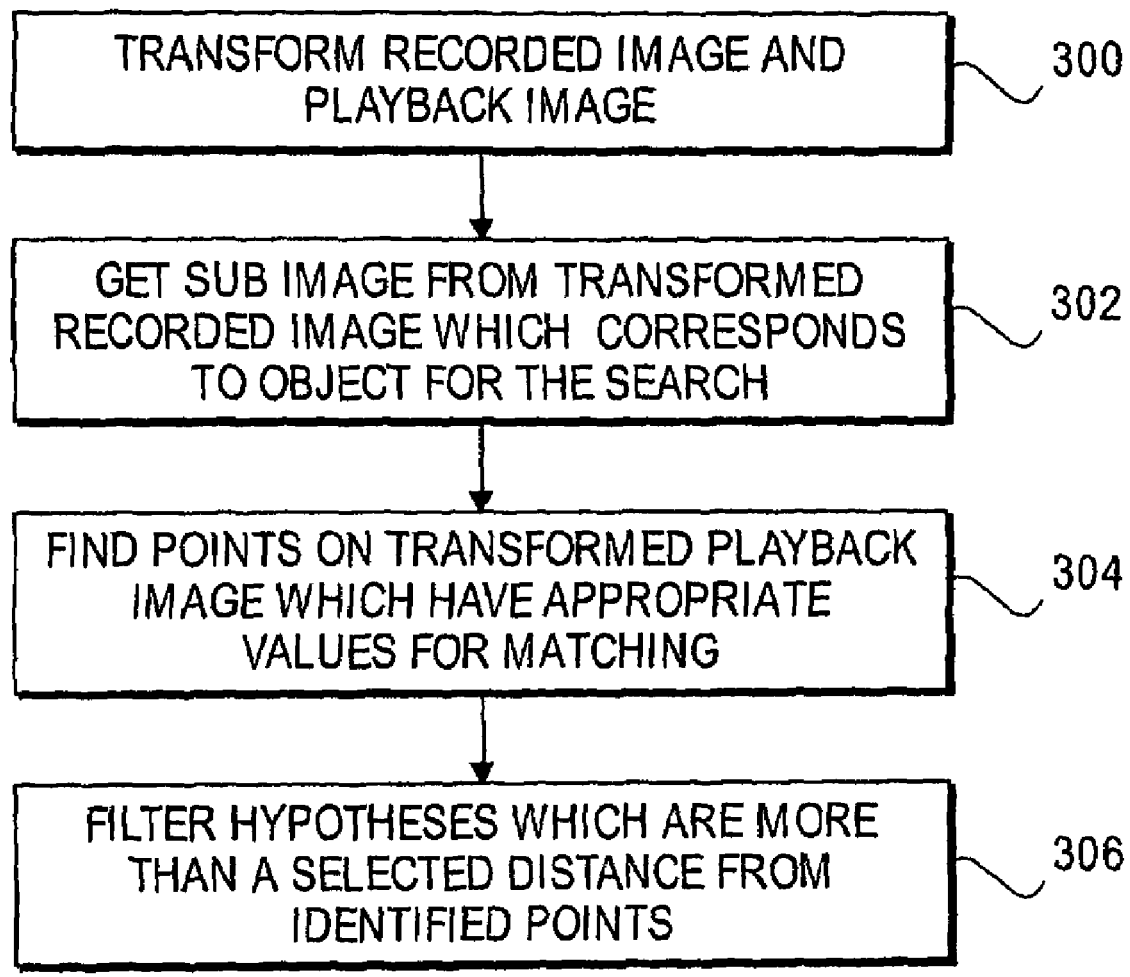
FIG. 18 is a flow diagram illustrating structural content filtration of hypotheses during the playback phase according to an embodiment of the present invention.

FIG. 18 is a flow diagram illustrating structural content filtration of hypotheses during the playback phase according to an embodiment of the present invention. At block 300, a recorded image and a playback image may be transformed according to equations 1 and 2, or alternatively by equations 3 and 4. At block 302, a sub-image may be obtained from the transformed recorded image which corresponds to an object to be searched for in the transformed playback image. At block 304, a set of points on the transformed playback image which have appropriate values for matching the sub-image may be determined in accordance with equations 5 or 6 and 7. At block 306, hypotheses may be filtered that are more than a selected distance from any one of the subset of points identified during block 304 and the result will be a decreasing of the number of wrong hypotheses. Every point from the $R_M$ set presents a top left corner of a rectangle of size w×h. Hypotheses are rejected if the contour of a hypothesis does not have an intersection with any rectangle from $R_M$. In another embodiment of the present invention, a stronger procedure for filtration may be used, e.g., a bound for the distance between the top left corner of a rectangle from $R_M$ and a contour of a hypothesis. The result of blocks 300-306 is the decreasing of the number of wrong hypotheses.

Structural content filtration according to embodiments of the present invention helps to effectively refresh scenarios when used in testing GUIs of application programs. This is helpful for easily updating old tests for application to new product versions. Easy adaptation for scenarios is very useful during GUI updates in software products. Moreover, the present method may be used in search schemes within the Cognitive Control Framework, such as for noise reduction runs and filtration for image objects. Other uses may be in the areas of computer vision, man machine interfaces, and product version control.

The structural content filtration method reduces the number of GUI hypotheses during the search, which is stable despite several kinds of GUI noise (e.g., changeable color schemes, highlighting, screen noise from devices, anti-aliasing effect, etc.).

The structural content approach to hypotheses filtration has at least several advantages. A first advantage of this approach is that it is applicable to any application program exposing a visual interface on any platform and operating system, and is not dependent on a specific API, or architecture of visual system implementation (like Win32 or X-Windows API), or specific operating system. It correlates with an advantage of the overall Cognitive Control Framework approach, which works across platforms. All other known systems are dependent to a small or large extent on system APIs while working with visual elements. A second advantage of this approach is that it is an easy way to significantly decrease the number of hypotheses for active objects. A third advantage is that it is an easy way to help with automatic portability of old scenarios to new versions of products. It decreases the time needed to support a baseline of scenarios for application program testing. A fourth advantage is that the method does not require significant computing resources compared to other methods. It introduces only minimal disturbance and delay in application execution during playback.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Although the operations detailed herein may be described as a sequential process, some of the operations may in fact be performed in parallel or concurrently. In addition, in some embodiments the order of the operations may be rearranged without departing from the scope of the invention.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multiprocessor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by a machine and that cause the machine to perform any one of the methods described herein. The term "machine accessible medium" shall accordingly include, but not be limited to, solid-state memories, and optical and magnetic disks. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

What is claimed is:

1. A computer-implemented method comprising:
   executing a playback component on a first processor of a first processing system, wherein the playback component is adapted to perform image analysis on images displayed on a graphical user interface as a result of processing simulated user input data during a playback phase of execution of an application program, and wherein the playback component is further adapted to analyze captured displayed images recorded during a recording phase of execution of the application program on a second processor of a second processing system, and wherein the playback component is further adapted to reduce a number of hypotheses for a location of an active object in a recorded image generated by the graphical user interface by
   transforming the recorded image and a corresponding playback image;
   determining a sub-image from the transformed recorded image which corresponds to an object to be searched for in the transformed playback image;
   determining a subset of points on the transformed playback image which have appropriate values for matching the sub-image; and
   filtering hypotheses on the playback image which are more than a selected distance from any one of the subset of points.

2. The method of claim 1, wherein transforming the recorded image and the corresponding playback image comprises changing color values of pixels in the images into at least one of black and white pixels.

3. The method of claim 1, wherein the object comprises a non-textual object.

4. The method of claim 1, wherein the filtered hypotheses are incorrect hypotheses for the active object.

5. The method of claim 1, wherein a hypothesis comprises a contour of an object on the playback image which corresponds to a contour of an object on the recorded image.

6. The method of claim 1, wherein filtering hypotheses comprises rejecting a hypothesis if the contour of the hypothesis does not have an intersection with any rectangle having a top left corner at a point of the subset of points and a predetermined width and height.

7. The method of claim 1, wherein filtering hypotheses comprises rejecting a hypothesis if the distance between one of points in the subset of points and a contour of the hypothesis is greater than a predetermined distance.

8. An article comprising: a machine readable tangible storage medium containing instructions, which when executed,
   execute a playback component on a first processor of a first processing system, wherein the playback component is adapted to perform image analysis on images displayed on a graphical user interface as a result of processing simulated user input data during a playback phase of execution of an application program, and wherein the playback component is further adapted to analyze captured displayed images recorded during a recording phase of execution of the application program on a second processor of a second processing system, and wherein the playback component is further adapted to reduce a number of hypotheses for a location of an active object in a recorded image generated by the graphical user interface by transforming the recorded image and a corresponding playback image;

determining a sub-image from the transformed recorded image which corresponds to an object to be searched for in the transformed playback image;

determining a subset of points on the transformed playback image which have appropriate values for matching the sub-image; and filtering hypotheses on the playback image which are more than a selected distance from any one of the subset of points.

9. The article of claim 8, wherein instructions to transform the recorded image and the corresponding playback image comprise instructions to change color values of pixels in the images into at least one of black and white pixels.

10. The article of claim 8, wherein the object comprises a non-textual object.

11. The article of claim 8, wherein the filtered hypotheses are incorrect hypotheses for the active object.

12. The article of claim 8, wherein a hypothesis comprises a contour of an object on the playback image which corresponds to a contour of an object on the recorded image.

13. The article of claim 8, wherein instructions to filter hypotheses comprise instructions to reject a hypothesis if the contour of the hypothesis does not have an intersection with any rectangle having a top left corner at a point of the subset of points and a predetermined width and height.

14. The article of claim 8, wherein instructions to filter hypotheses comprise instructions to reject a hypothesis if the distance between one of points in the subset of points and a contour of the hypothesis is greater than a predetermined distance.

15. A cognitive control framework system for automatically controlling execution of an application program having a graphical user interface comprising:

a recording component adapted to capture user input data and images displayed by the graphical user interface during a recording phase of execution of the application program, and to analyze the captured user input data and displayed images to generate an execution scenario during the recording phase; and a playback component adapted to perform image analysis on images displayed by the graphical user interface as a result of processing the simulated user input data during the playback phase and captured displayed images from the recording phase, the playback component being adapted to reduce the number of hypotheses for the location of an active object in a recorded image generated by the graphical user interface by transforming the recorded image and a corresponding playback image;

determining a sub-image from the transformed recorded image which corresponds to an object to be searched for in the transformed playback image;

determining a subset of points on the transformed playback image which have appropriate values for matching the sub-image; and filtering hypotheses on the playback image which are more than a selected distance from any one of the subset of points.

16. The system of claim 15, wherein transforming the recorded image and the corresponding playback image comprises changing color values of pixels in the images into at least one of black and white pixels.

17. The system of claim 15, wherein the object comprises a non-textual object.

18. The system of claim 15, wherein the filtered hypotheses are incorrect hypotheses for the active object.

19. The system of claim 15, wherein a hypothesis comprises a contour of an object on the playback image which corresponds to a contour of an object on the recorded image.

20. The system of claim 15, wherein filtering hypotheses comprises rejecting a hypothesis if the contour of the hypothesis does not have an intersection with any rectangle having a top left corner at a point of the subset of points and a predetermined width and height.

21. The method of claim 15, wherein filtering hypotheses comprises rejecting a hypothesis if the distance between one of points in the subset of points and a contour of the hypothesis is greater than a predetermined distance.

* * * * *